(12) United States Patent
Heren et al.

(10) Patent No.: US 10,131,224 B2
(45) Date of Patent: Nov. 20, 2018

(54) OIL DISTRIBUTION DEVICE WITH A NON-RETURN VALVE

(71) Applicant: POCLAIN HYDRAULICS INDUSTRIE, Verberie (FR)

(72) Inventors: Jean Andre Heren, Verberie (FR); Cyrille D'Hersignerie, Verberie (FR)

(73) Assignee: POCLAIN HYDRAULICS INDUSTRIE, Verberie (FR)

(*) Notice: Subject to any disclaimer, the term of this patent is extended or adjusted under 35 U.S.C. 154(b) by 0 days.

(21) Appl. No.: 14/835,621

(22) Filed: Aug. 25, 2015

(65) Prior Publication Data

US 2016/0059694 A1 Mar. 3, 2016

(30) Foreign Application Priority Data

Aug. 26, 2014 (FR) ...................................... 14 57994

(51) Int. Cl.
*B60K 17/10* (2006.01)
*B60K 17/356* (2006.01)
(Continued)

(52) U.S. Cl.
CPC ............ *B60K 17/10* (2013.01); *B60K 7/0015* (2013.01); *B60K 17/356* (2013.01); *B60K 28/16* (2013.01); *F16H 39/02* (2013.01); *F16H 61/4035* (2013.01); *F16H 61/431* (2013.01); *F16H 61/44* (2013.01); *F16H 61/444* (2013.01); *G05D 7/0682* (2013.01); *B60Y 2200/221* (2013.01)

(58) Field of Classification Search
CPC ....... B60K 17/10; B60K 7/0015; F16H 39/02; F16H 61/4035; F16H 61/44; F16H 61/444

USPC .......................................................... 180/242
See application file for complete search history.

(56) References Cited

U.S. PATENT DOCUMENTS 4,040,254 A * 8/1977 Knapp ................. B62D 11/183
180/6.48
4,241,577 A * 12/1980 Baldauf ................. B60K 17/10
180/242

(Continued)

FOREIGN PATENT DOCUMENTS

DE 19833942 2/2000
FR 2044296 2/1971

OTHER PUBLICATIONS

French Search Report and Written Opinion, dated May 6, 2015, French Application No. 1457994.

*Primary Examiner* — Kevin Hurley
*Assistant Examiner* — Michael R Stabley
(74) *Attorney, Agent, or Firm* — Womble Bond Dickinson (US) LLP

(57) ABSTRACT

The invention relates to a hydraulic transmission device for a vehicle, said device comprising a first pump and a second pump, a first hydraulic apparatus and a second hydraulic apparatus, a first supply circuit connecting the first pump to the first apparatus, and a second supply circuit connecting the second pump to the second apparatus and wherein a non-return valve between the supply circuits, the valve having a direction for passing from the first to the second supply circuit, a first return circuit connecting the first apparatus to said pumps, a second return circuit the second apparatus to the admissions to said pumps so that the return circuits are in permanent fluidic communication with each other through a junction.

15 Claims, 12 Drawing Sheets

(51) Int. Cl.

| | |
|---|---|
| *F16H 61/4035* | (2010.01) |
| *F16H 39/02* | (2006.01) |
| *F16H 61/431* | (2010.01) |
| *F16H 61/444* | (2010.01) |
| *B60K 7/00* | (2006.01) |
| *B60K 28/16* | (2006.01) |
| *F16H 61/44* | (2006.01) |
| *G05D 7/06* | (2006.01) |

(56) References Cited

U.S. PATENT DOCUMENTS

| | | | | |
|---|---|---|---|---|
| 4,401,182 | A * | 8/1983 | Pollman | F16H 61/439 180/197 |
| 5,542,251 | A * | 8/1996 | Leibing | B60K 17/10 60/426 |
| 6,276,468 | B1 * | 8/2001 | Essig | B62D 11/005 180/307 |
| 6,749,037 | B2 * | 6/2004 | Lindholdt | F16H 61/4157 180/197 |
| 7,178,334 | B2 * | 2/2007 | Beck | B60K 17/356 180/308 |
| 7,886,533 | B2 * | 2/2011 | Vogl | F16H 61/44 60/484 |
| 8,033,107 | B2 * | 10/2011 | Tikkanen | F15B 7/006 60/464 |
| 2007/0113549 | A1 * | 5/2007 | Essig | F04B 1/22 60/487 |
| 2007/0144166 | A1 * | 6/2007 | Rueckgauer | F04B 1/20 60/485 |

* cited by examiner

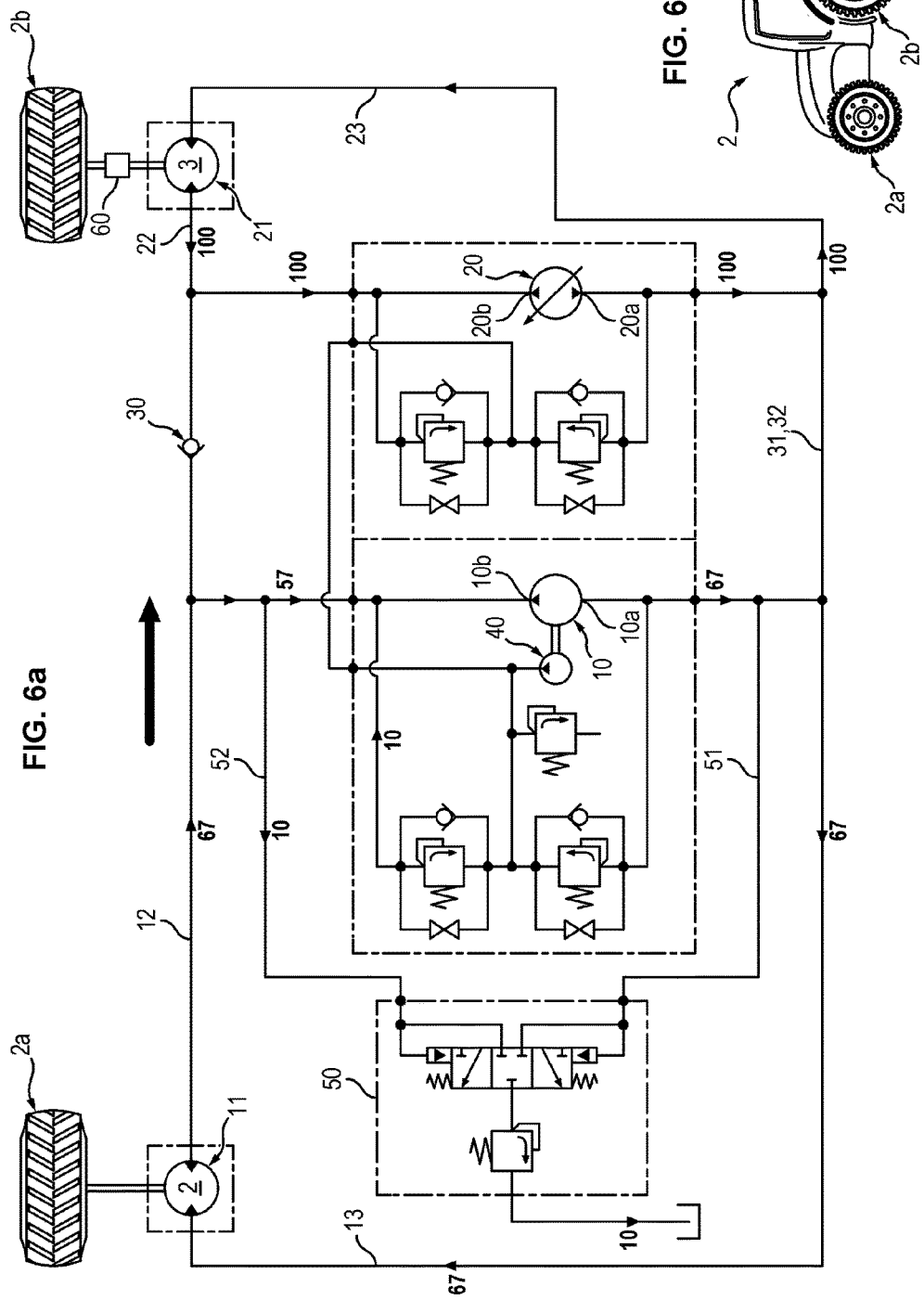

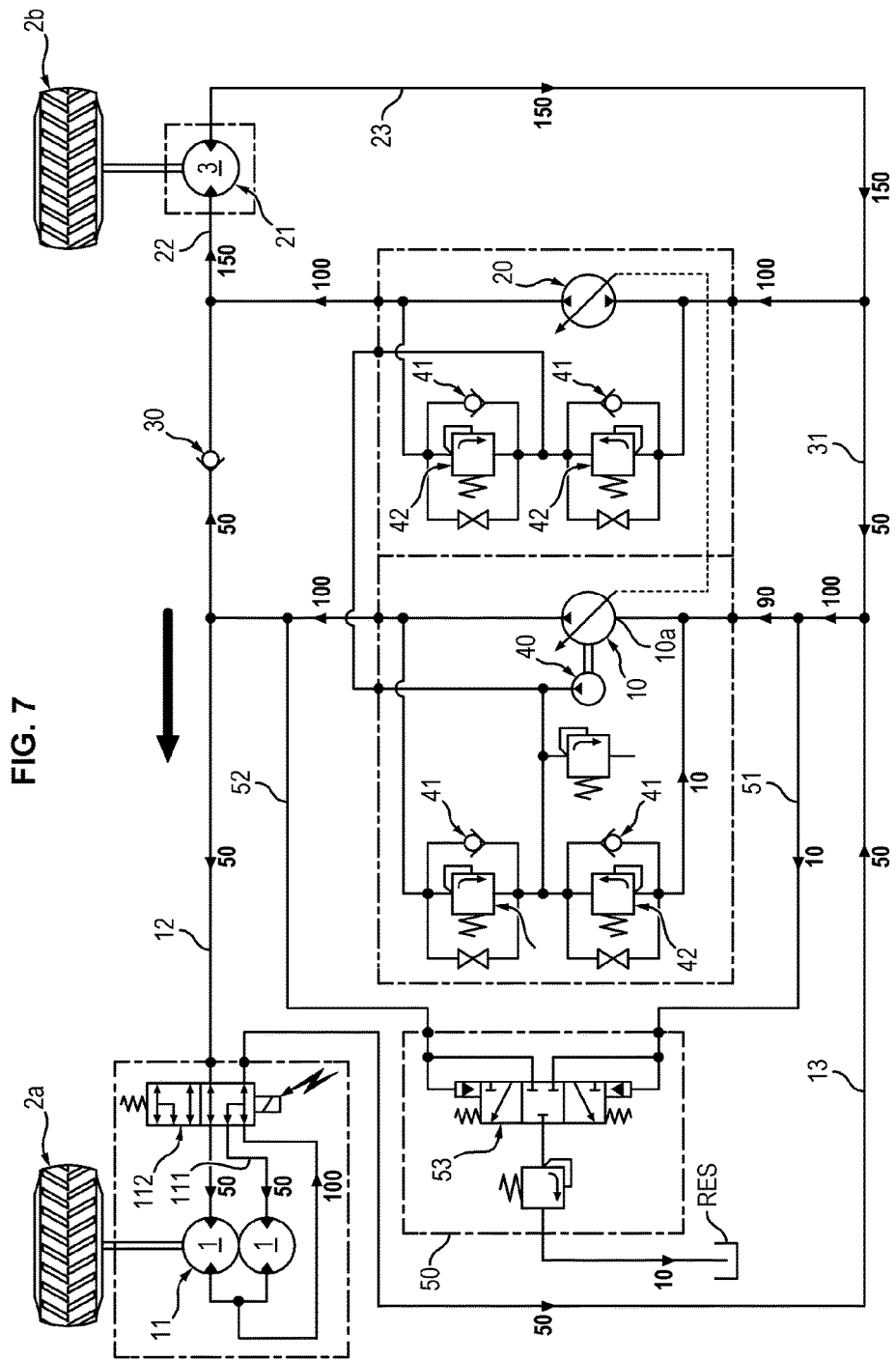

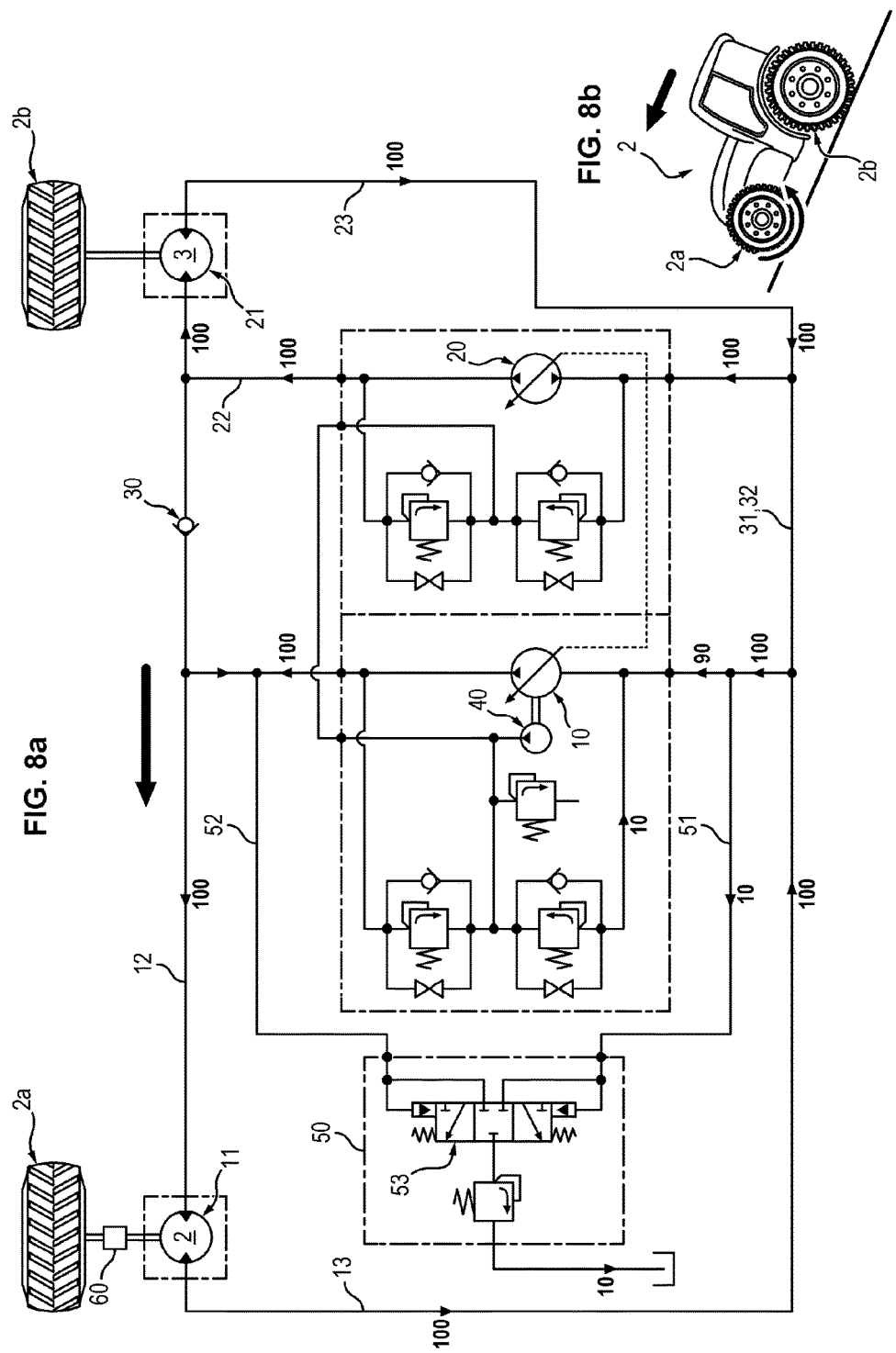

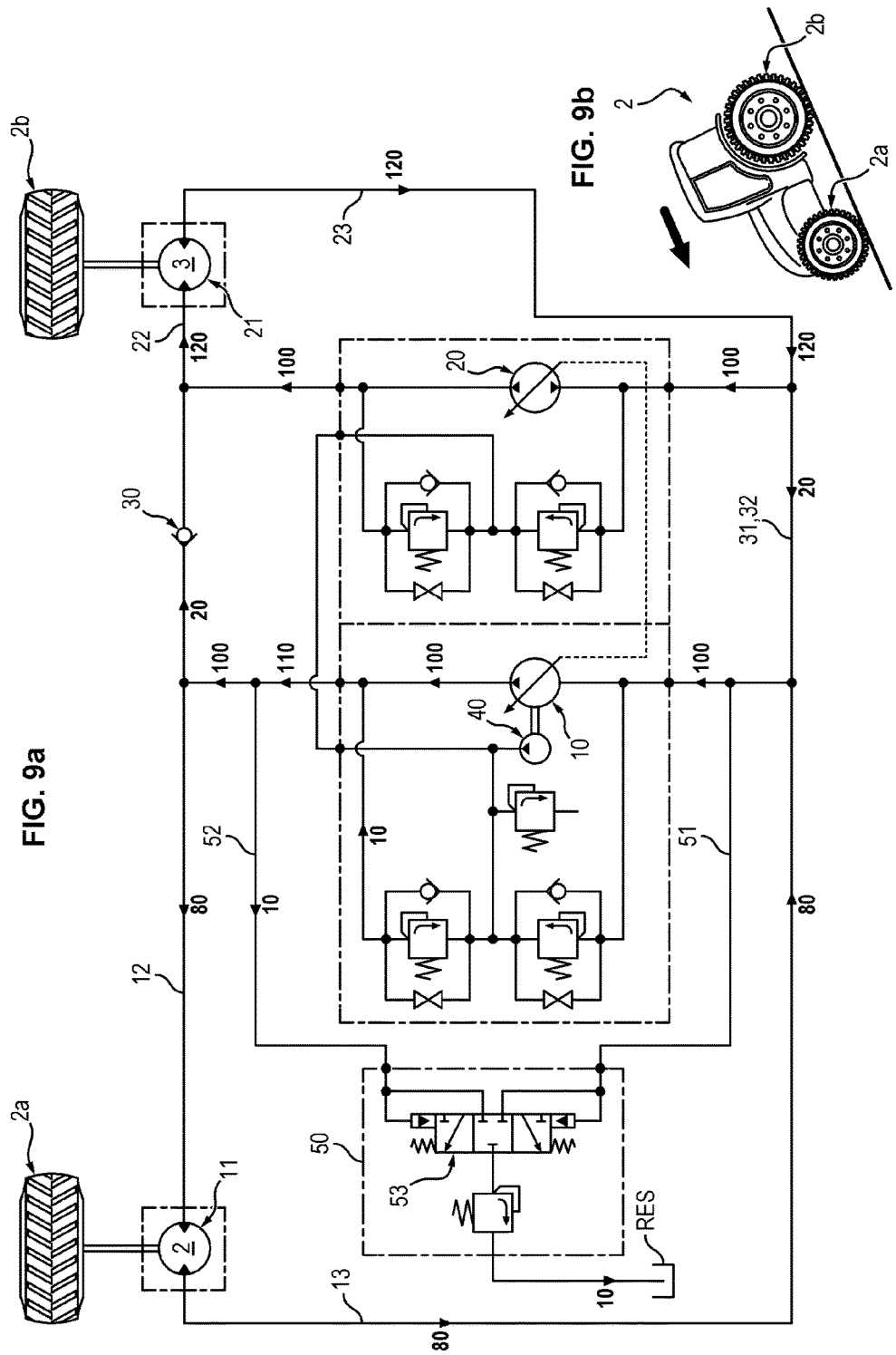

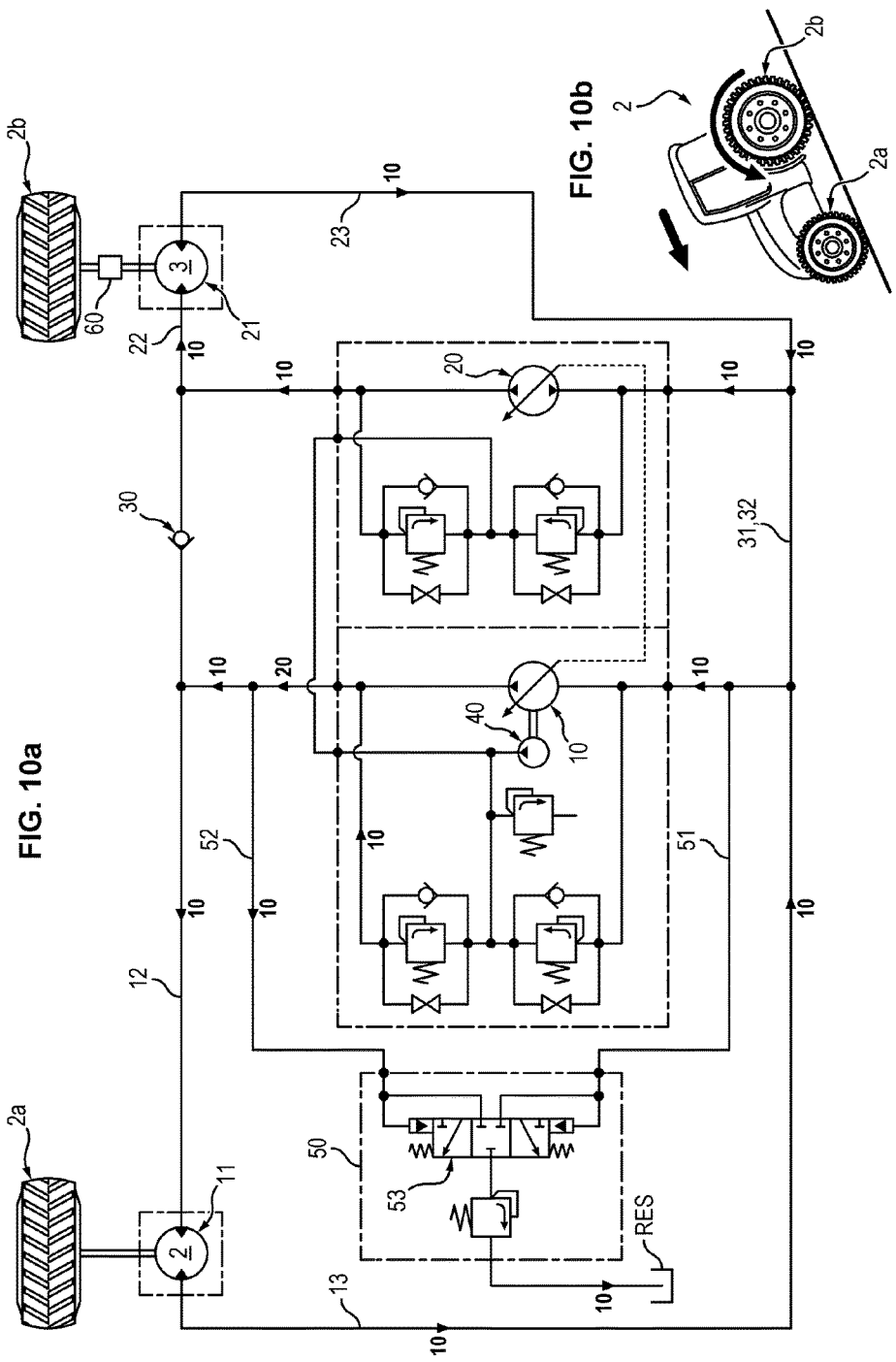

OIL DISTRIBUTION DEVICE WITH A NON-RETURN VALVE

GENERAL TECHNICAL FIELD

The invention relates to the field of hydraulic circuits for assisting drivability notably used for vehicles.

In particular, the invention relates to managing the flow rate of supply pumps.

STATE OF THE ART

The use of hydraulic apparatuses is known for achieving the driving of vehicles, notably with applications for agricultural machines (of the baler, combine harvester or self-propelled spraying machine type) or building site machines.

These vehicles generally have two kinds of operation:
An operation under working conditions: the speeds are quite low, typically less than 20 km/h and the torque need is significant (loaded vehicle, slope, difficult terrain, etc.)
An operation under transfer conditions: the speeds are higher, typically more than 20 km/h and the torque need is lower (empty vehicle, no slope, accessible terrain, etc).

In the whole of the present text, by hydraulic apparatus will be designated an apparatus which may operate as a motor or as a hydraulic pump.

These vehicles comprise hydraulic motors and a hydrostatic transmission, which may provide power to each of the axles, in particular to each of the wheels.

Upon passing in "difficult" areas (a steep slope for example), a loss of adherence may occur on one or several wheels, which is detrimental to the performances of the vehicle.

Presently there exist solutions for limiting these pitfalls.

Figure 1A:
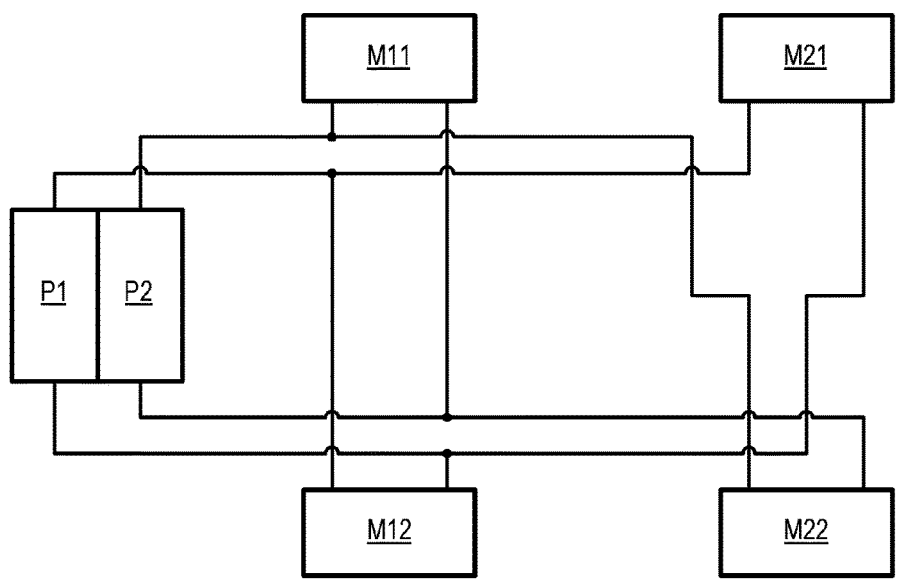
Figure 1B:
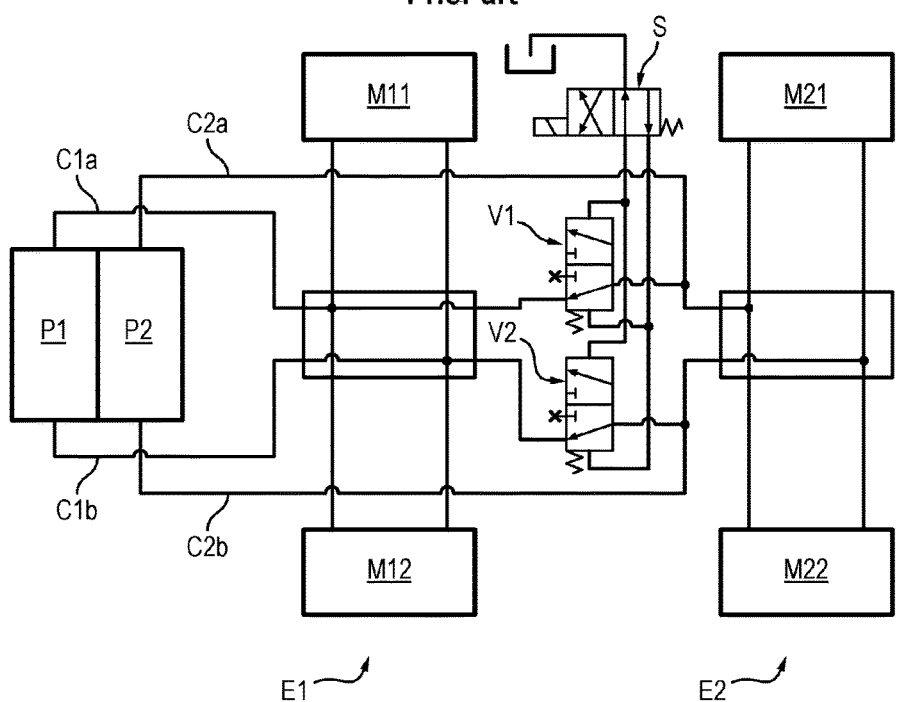

In the case of vehicles comprising, as illustrated in FIGS. 1a, 1b, two pumps P1, P2 and one motor M11, M12, M21, M22 (which may be of variable cylinder capacity) on each of the wheels of the front E1 and rear E2 axles, two ways for connecting the motors to the pumps are generally found:
In a crossed circuit (see FIG. 1a): the pump P1 may for example be connected to the front left M12 and rear right M21 motors and the other pump P2 to the front right M11 and rear left M22 motors.
Such a configuration gives the possibility of changing the cylinder capacity of the motors per axle E1, E2, without having to modify the relative flow rates of each pump P1, P2. On the other hand, the loss of adherence on a complete axle strongly limits the performances of the vehicle, notably in the case of a steep slope (moving upwards or downwards). One of the solutions consists of adding flow rate dividers (or limiters) to be set up at the outlet of pumps P1, P2. The latter involve an additional cost as well as delicate handling.
In a separate circuit per axle (seer FIG. 1b): each pump is connected to a single axle, i.e.:
the pump P1 feeds the motors M11, M12 of the front axle E1 through a supply C1a and a return C1b circuit and
the pump P2 feeds the motors M21, M22 of the rear axle E2 through a supply C2a and return C2b circuit.
Nevertheless, an exchange between both supply hydraulic circuits C1a, C2a is possible by means of a valve V1 having a passage position and a blocking position, and an exchange between both return circuits C1b, C2b is possible by means of a valve V2 having a passage position and a blocking position. Both valves V1, V2 are driven by a selector S typically controlled by a pedal.

In a "normal" i.e. not "difficult" situation, both valves V1, V2 are not blocking and each pump P1, P2 participates in the power received by both axles E1, E2. In a difficult situation, the valves V1 and V2 are blocking valves and each pump only feeds a single axle.

Such a configuration complicates the changing of cylinder capacity per axle and leads to the introduction of valves for intercommunication between the circuits, which in fact means joining them up together.

Further, both mentioned solutions require strong vigilance as to the accuracy of the pump and pressure level commands in each circuit, so that the motors on each axle work together and in a balanced way.

Finally, a command also has to be provided for opening the intercommunication between the circuits, during operations in a transfer mode (i.e. generally on a roadway, with a small load and at speeds above 20 km/h), comparatively with a working mode (i.e. generally in fields, with a great load and a speed of less than 20 km/h).

The invention proposes suppression of these intercommunication elements and of their command, while proposing comparable performances.

PRESENTATION OF THE INVENTION

For this, the invention proposes a hydraulic transmission device for a vehicle, said device comprising:
a first pump and a second pump, each pump comprising an admission and a discharge,
a first hydraulic apparatus and a second hydraulic apparatus, each apparatus comprising an admission and a discharge,
a first supply circuit connecting the discharge of the first pump to the admission of the first apparatus and,
a second supply circuit connecting the discharge of the second pump to the admission of the second apparatus and wherein:
a non-return valve between the supply circuits, the valve having a passage direction from the first to the second supply circuit,
a first return circuit connecting the discharge of the first apparatus to the admissions of said pumps,
a second return circuit connecting the discharge of the second apparatus to the admissions of said pumps,
so that the return circuits are in permanent fluidic communication with each other through a junction.

The invention thus allows simplification of the circuit while reducing the cost of the solution. Further, a reduction in the pressure drops is observed as compared with the prior art, and there is no control to be provided, the non-return valve being self-contained and mechanically controlled by the pressures and flow rates in the supply circuits. Further, the non-return valve gives the possibility of obtaining satisfactory operation without resorting to fine control of both pumps. Finally, this type of closed-loop circuit technique is generally applicable, regardless of the number of wheels, the variability of the cylinder capacities, the technology of the motors and of the pumps.

Advantageously, the invention comprises the following features, taken alone or as a combination:
the first return circuit is connected to the admission of the first pump and the second return circuit is connected to the admission of the second pump, both return circuits being connected together through a communication circuit, the first return circuit is connected to the admission of the second pump and the second return circuit is connected to the admission of the first pump, both return circuits being connected together through a communication circuit, the second apparatus has a greater cylinder capacity than the first apparatus, the device as described earlier further comprises an exchange block able to sample oil for its treatment, said exchange block comprising a main sampling circuit sampling the fluid between:
the junction of the return circuits and
the admission of the first pump,
so that the exchange block may sample oil both from the first and from the second apparatus, the exchange block further comprises a secondary sampling circuit sampling the fluid between:
the admission of the first apparatus and
the discharge of the first pump, both sampling circuits being connected at a selector able to close both circuits or to connect one of the two circuits to a draining circuit while closing the other one, the pumps are pumps with proportional electric control, the second pump having an upper maximum flow rate of less than or equal to the maximum admissible flow rate in the second apparatus, for a determined speed of rotation of the apparatuses, the flow rate of the second pump is less than the call flow rate of the second required apparatus, and the flow rate of the first pump is greater than the call flow rate of the first apparatus, so that the first pump is able to complete the call flow rate of the second apparatus via the non-return valve.

The invention also relates to a vehicle comprising a device as described earlier, having a preferential moving direction defining front and rear wheels, in which the first hydraulic apparatus powers at least one front wheel and the second hydraulic apparatus powers a rear wheel.

The invention also relates to a method for using a vehicle as described earlier, said vehicle having a second apparatus with a cylinder capacity greater than that of the first apparatus, said method comprising a step during which the non-return valve sends a flow of oil from the first pump to the second apparatus.

Advantageously, the method comprises the following features taken alone or as a combination:
the method comprises a sequence of steps in which the non-return valve switches from a passage condition to a blocking condition when:
the front wheels start to skid during forward motion,
the rear wheels are blocked during retention in forward motion,
the method comprises a sequence of steps in which the non-return valve passes from a blocking condition to a passage condition when:
the front wheels stop skidding during forward motion,
the rear wheels are unblocked during retention in forward motion,
the vehicle is in rear motion, and the method comprises the steps:
detecting a slip of a rear wheel,
adjusting the flow rate of the first pump in order to provide at most the flow called by the first apparatus.
the vehicle is in forward motion, and the method comprises the steps of:
detecting a slip of a front wheel,
adjusting the flow rate of the second pump in order to provide the whole of the flow rate called by the second apparatus,
the front wheels of the vehicle are steered wheels, and the method comprises the steps of:
detecting a bend made by the vehicle,
adjusting the flow rate of the first and second pumps in order to provide the whole of the flow rates called by the first apparatus and the second apparatus respectively.

PRESENTATION OF THE FIGURES

Figure 2:
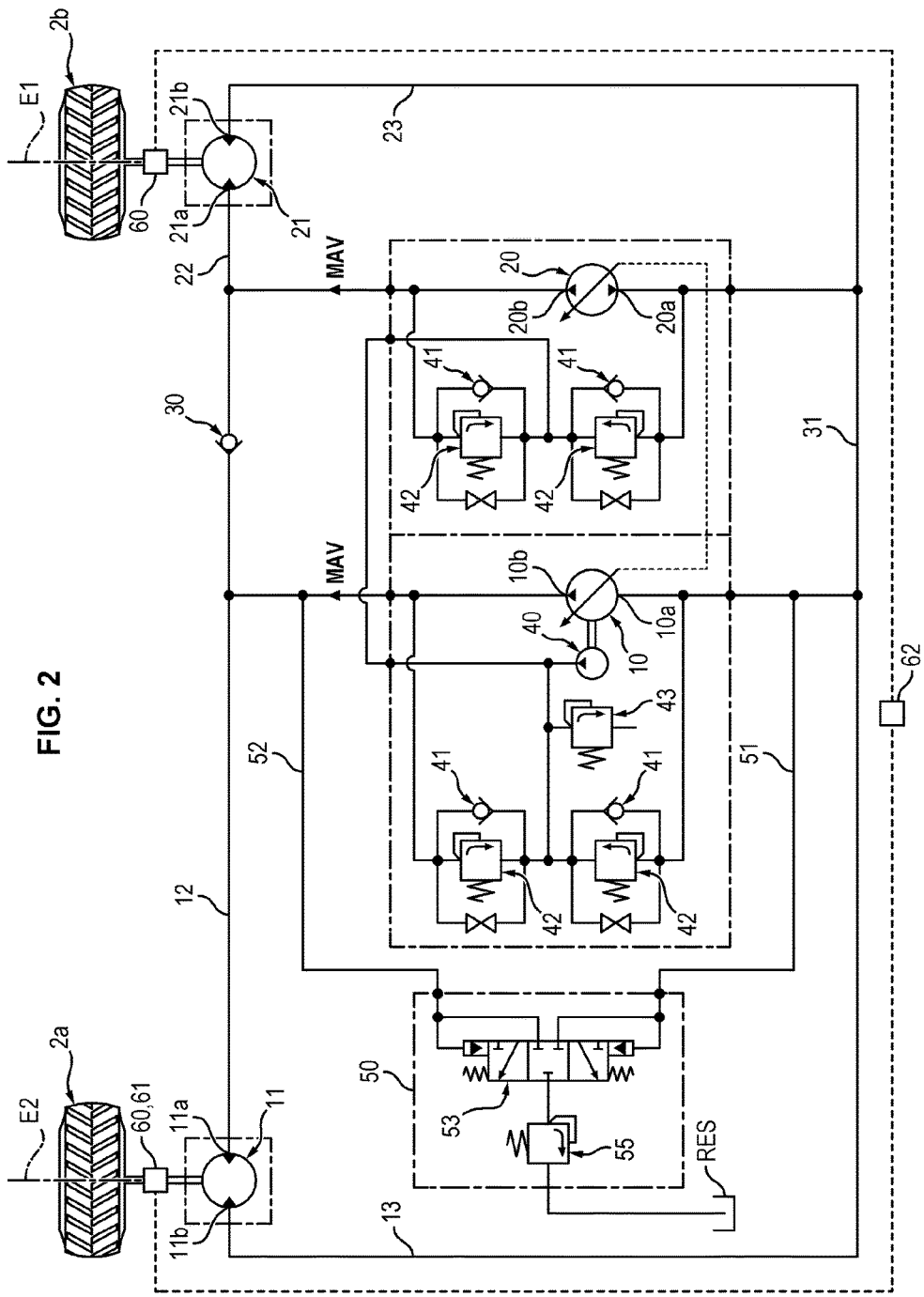
Figure 3A:
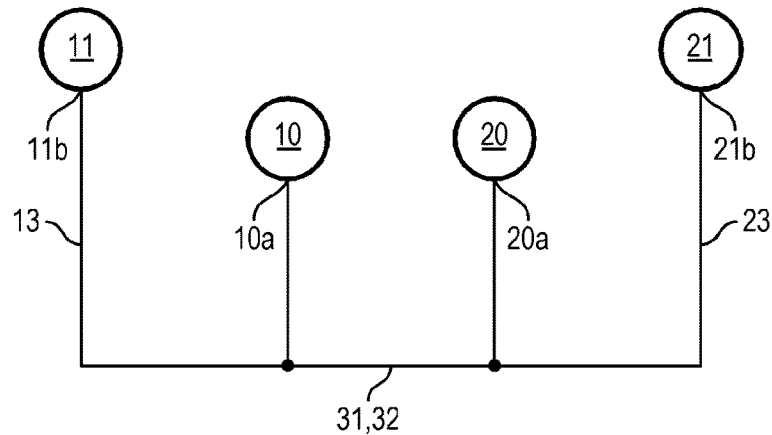
Figure 3B:
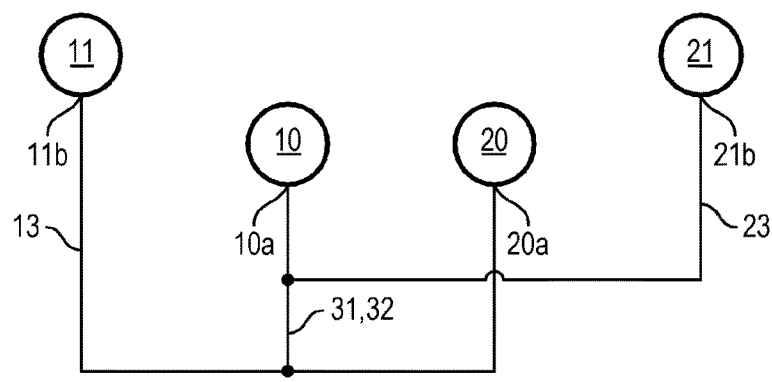
Figure 3C:
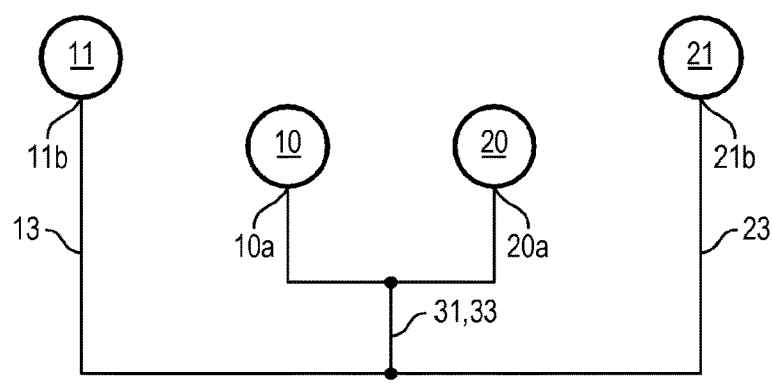
Figure 4:
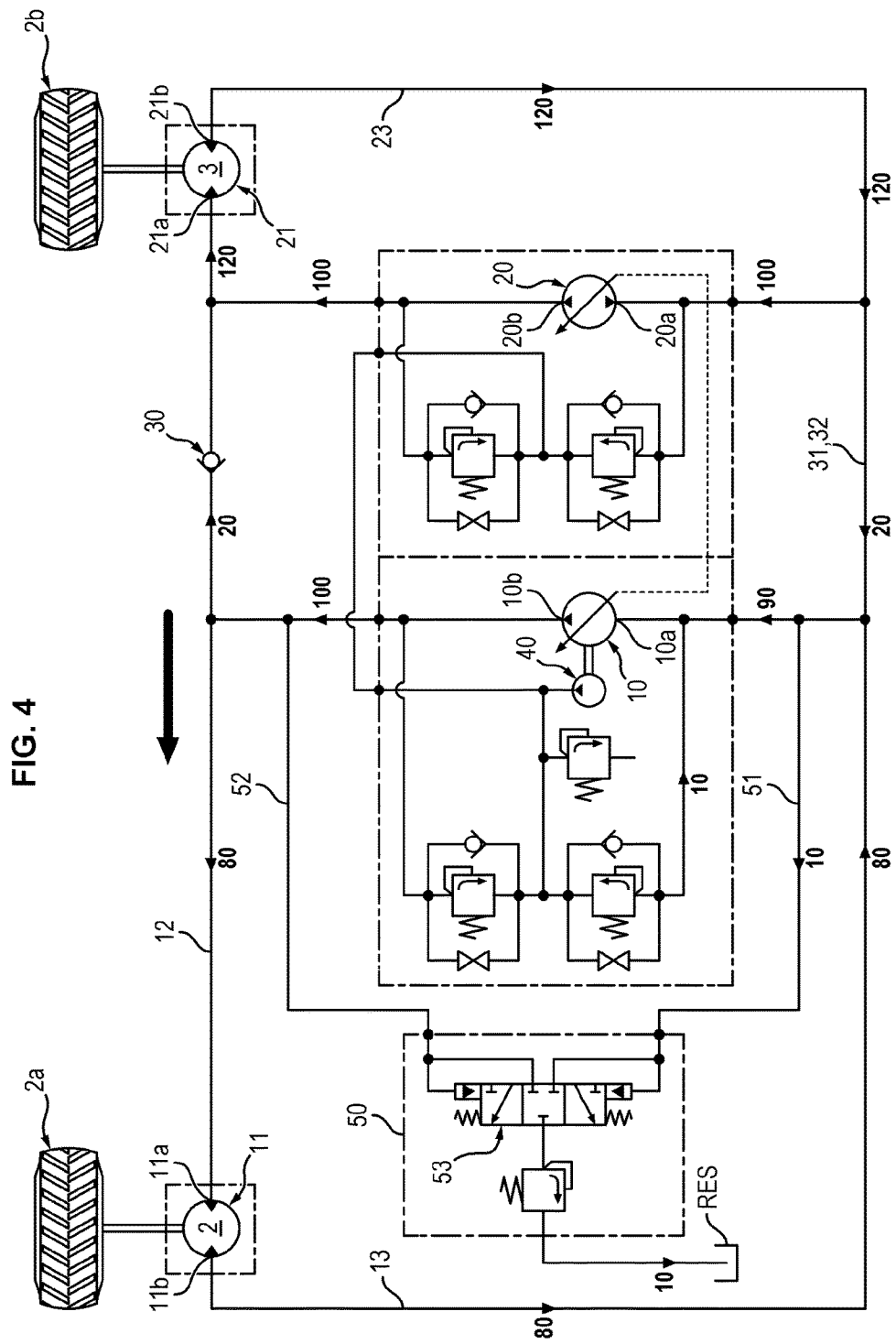
Figure 5:
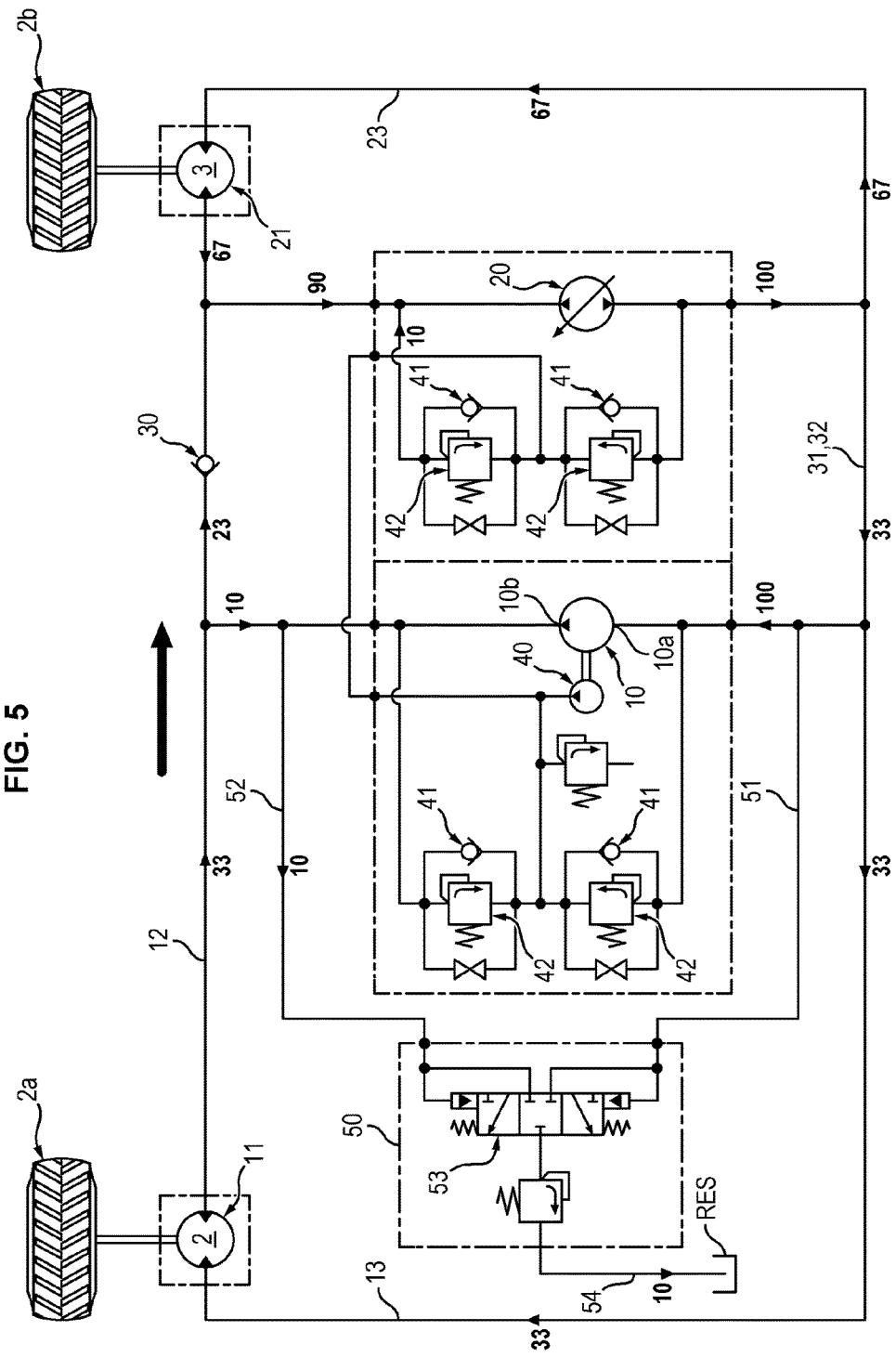

Other features, objects and advantages of the invention will become apparent from the description which follows, which is purely illustrative and non-limiting, and which should be read with reference to the appended drawings, wherein:

FIGS. 1a, 1b illustrate the state of the art,

FIG. 2 illustrates a device according to an embodiment of the invention mounted on a vehicle, FIGS. 3a, 3b, 3c illustrate different embodiments of the device, FIG. 4 illustrates the previous device with the vehicle in forward motion, without any skidding, FIG. 5 illustrates the previous device with the vehicle in rear motion, without any skidding, FIG. 6a illustrates the previous device with the vehicle in rear motion and skidding of the rear wheels, FIG. 6b illustrates this situation, FIG. 7 illustrates a device according to an embodiment of the invention mounted on a vehicle, with the vehicle in forward motion, without any skidding, under a transfer condition, FIG. 8a illustrates a device with the vehicle in forward motion, and skidding of the front wheels; FIG. 8b illustrates this situation, FIG. 9a illustrates a device with the vehicle in forward motion, and with retention and without blocking of the wheels; FIG. 9b illustrates this situation, FIG. 10a illustrates a device with the vehicle in forward motion, and with retention and with blocking of the rear wheels; FIG. 10b illustrates this situation.

Figure 11A:
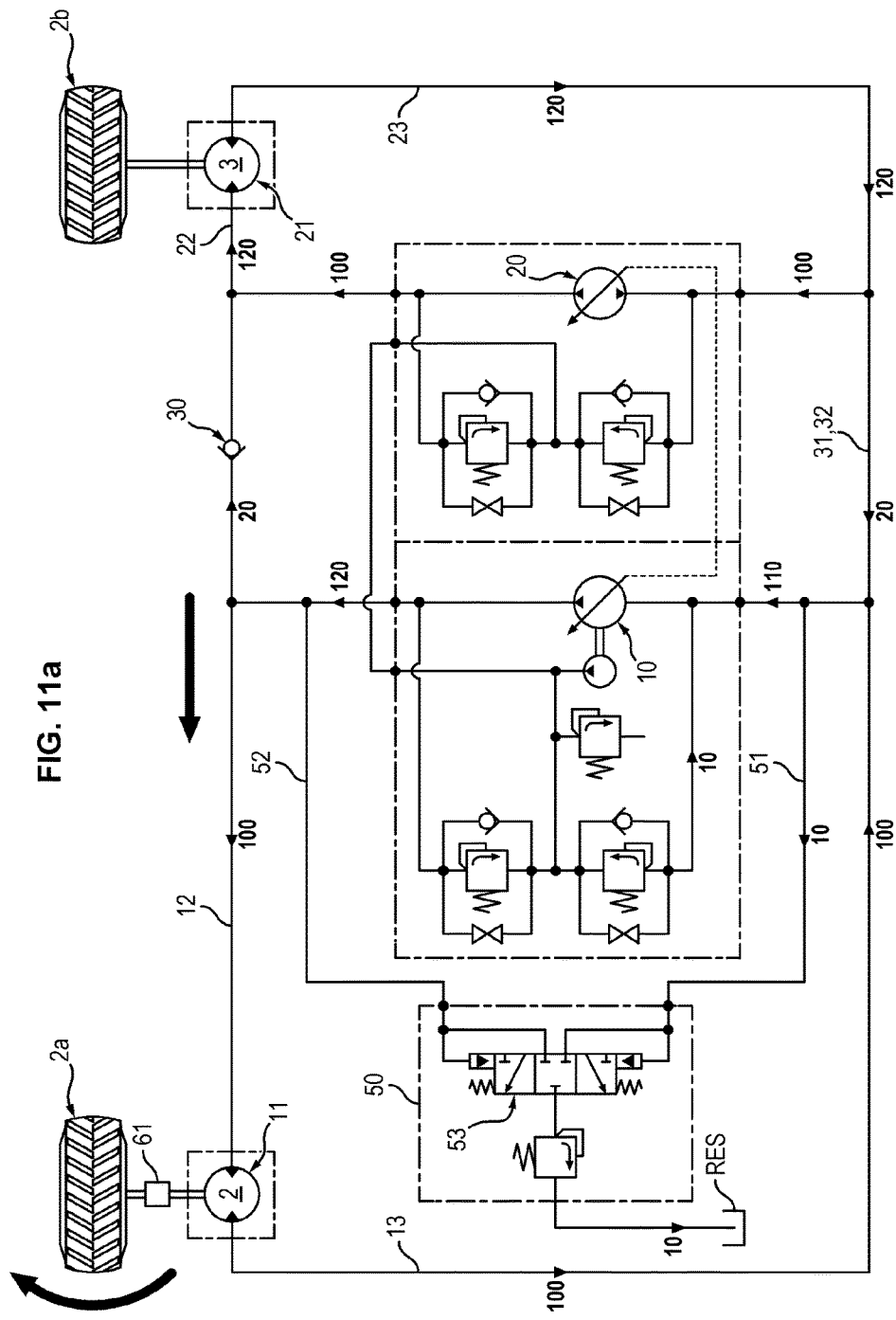
Figure 11B:
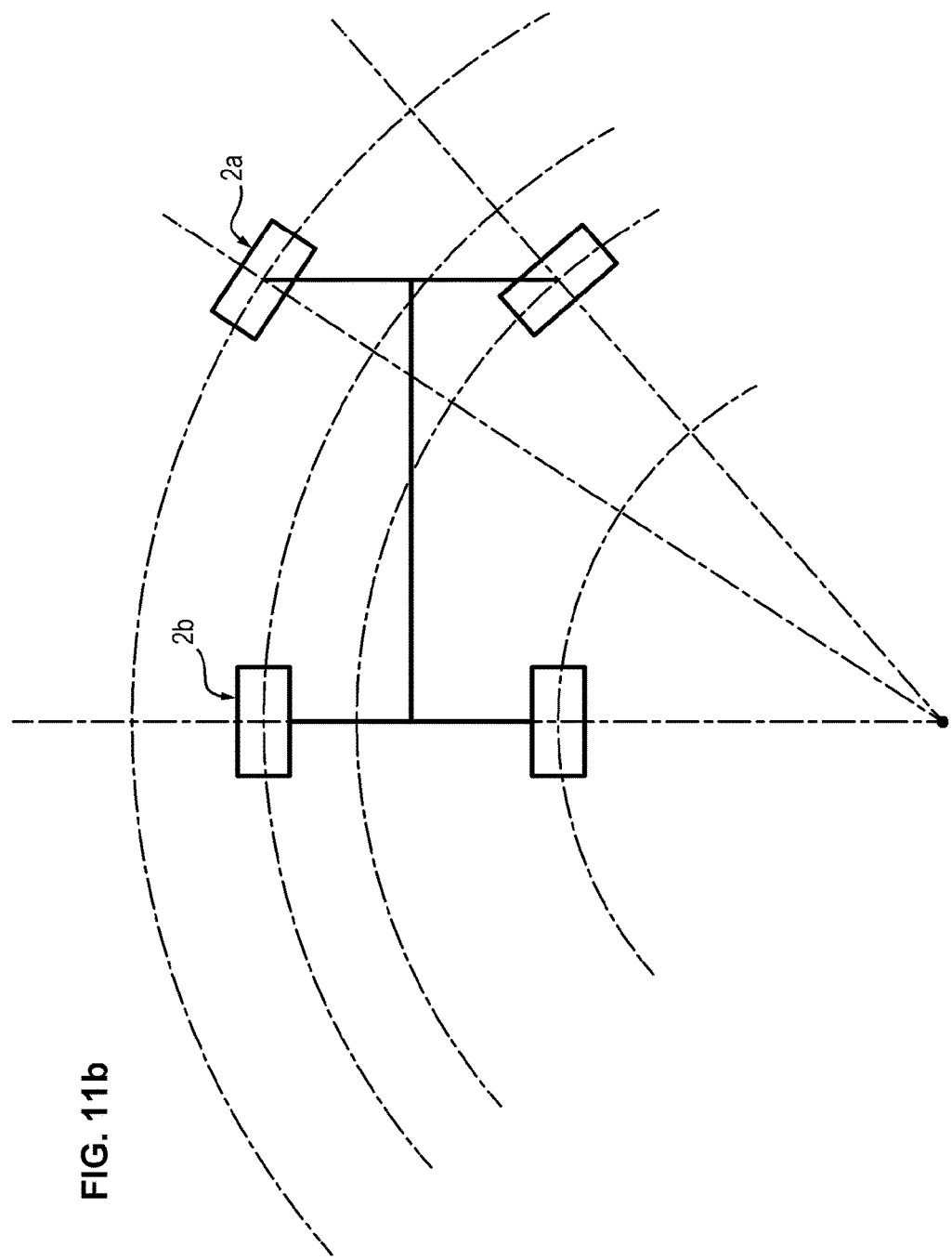

FIG. 11a illustrates a device with the vehicle in a bend; FIG. 11b illustrates this situation.

DETAILED DESCRIPTION

For reasons of symmetry and simplification, only one side of the device 1 as implanted on a vehicle 2, will first be described.

With reference to FIG. 2, the invention comprises:
a first pump 10 and a second pump 20, each pump 10, 20 comprising an admission 10a, 20a and a discharge 10b, 20b,
a first hydraulic apparatus 11 and a second hydraulic apparatus 21, each apparatus 11, 21 comprising an admission 11a, 21a and a discharge 11b, 21b, The invention further comprises:
a non-return valve 30 located between the supply circuits 12, 22, the valve 30 having a passage direction from the first 12 to the second supply circuit 22,
a first return circuit 13 connecting the discharge 11b of the first apparatus 10 to the admissions 10b, 20b of said pumps 10, 20, a second return circuit 23 connecting the discharge of the second apparatus 20 to the admissions 10b, 20b of said pumps 10, 20, so that the return circuits 13, 23 are in permanent fluidic communication with each other, through a junction 31.

Between the supply circuits 12, 22, the fluidic communication is made if the pressure inside the first supply circuit 12 is greater than the pressure inside the second supply circuit 22: the non-return valve 30 is then open. Such a valve 30 allows limitation of the pressure drops during use, as compared with the devices of the prior art. For example, accumulation of oil in the first supply circuit 12 will cause an overpressure which will open the non-return valve 30.

Further, as the non-return valve 30 allows distribution of the oil flow from the first supply circuit 12 to the second circuit 22, it is possible to obtain satisfactory operation of the device 1 without specifically controlling the flow rates of the pumps 10, 20.

Thus this is a closed-loop circuit.

It is recalled here that a hydraulic apparatus is a machine which may operate like a motor, i.e. the hydraulic power is converted into mechanical power, or like a pump, i.e. the mechanical power is converted into hydraulic power. In a widely majority way, during common use, the apparatuses 11, 21 operate as motors.

According to an embodiment, they are typically mounted on axles E1, E2. Further, the hydraulic apparatuses advantageously rotate at the speed of the wheels, which means there is no reduction stage between the output of an apparatus and the wheel which is driven by the latter. Hydraulic apparatuses advantageously are machines with radial pistons and multilobe cams.

Hydraulic apparatuses advantageously are with a case rotating on a wheel axle, i.e. the rotation of the case drives the wheel or else with a fixed case and a rotating shaft, i.e. it is an output shaft of the apparatus which drives the wheel.

According to another embodiment, the hydraulic apparatuses include the bearing of the wheel and each bear a wheel (hence the name of "wheel motor"), then there is no axle.

Similarly, the pumps 10, 20 may also operate as motors. In common use, the pumps 10, 20 actually operate as pumps.

The pumps advantageously are machines with axial pistons and an oscillating plate.

Further, the hydraulic apparatuses 11, 12 may operate in both directions, i.e. with clockwise and anti-clockwise rotation. In this way, the terms of "admission" and "discharge" are by no means limiting and an admission orifice may also if necessary, be alternatively a discharge orifice.

Similarly, the pumps 10, 20 may operate in both directions.

The pumps 10, 20 may be with a variable or set cylinder capacity and are typically fed by a thermal engine (not shown in the figures).

The device further comprises a booster pump 40 and an oil tank Res, the booster pump drawing the oil from the tank Res.

The booster pump 40 is connected to each supply circuit 12, 22 and to each return circuit 13, 23 through a respective non-return valve 41 (allowing boosting of fluid towards the circuits) and a respective pressure limiter 42, so as to allow boosting of oil into circuits (via the four non-return valves 41) by protecting the pumps from overpressure (by means of four pressure limiters 42). A pressure limiter 43 is also found between the output of the booster pump 40 and the tank Res.

It is also possible to find a valve in parallel on said valves 41 and limiters 42, in order to allow towing of a vehicle and having a free wheel mode.

These elements are known to one skilled in the art and will not be detailed unduly.

The connections between the return circuits 13, 23 and the pumps 10, 20, as well as the junction 31 may be made in different ways:

Diagram A (see FIG. 3a): the first return circuit 13 is connected to the admission 10a of the first pump 10 and the second return circuit 23 is connected to the admission 20a of the second pump 20. The junction 31 is a communication circuit 32 (as illustrated in FIGS. 2, 3a, 4 to 9) which connects both return circuits 13, 23, so that both return circuits 13, 23 are in communication via said communication circuit 32, Diagram B (see FIG. 3b): the first return circuit 13 is connected to the admission 20a of the second pump 20 and the second return circuit 23 is connected to the admission 10a of the first pump 10. The junction 31 is the communication circuit 32 which connects both return circuits 13, 23, so that both return circuits 13, 23 are in communication via said communication circuit 32, Diagram C (see FIG. 3c): the return circuits 13, 23 join up as a common portion 33 (which is the junction 31), the common portion 33 being divided again so as to connect the admissions 10b, 20b of the pumps 10, 20 respectively, the common portion 33 acting like a mixer.

From a technical point of view, diagram A is the most simple to produce (less piping). On the other hand, diagram B allows 8-shaped circulation of oil, i.e. the major portion of the oil successively circulates from the first pump 10 to the first apparatus 11, and then towards the second pump 20 and the second apparatus 21. Finally, diagram C, which allows good mixing of the oil of both circuits, is more complex to make: the common portion 33 is subject to quasi twice the flow rate relatively to that of the other portions of the circuits and requires suitable piping.

The device 1 also advantageously comprises an exchange block 50, the purpose of which is to allow renewal of the oil and cooling of the circuits. Indeed, during its operating cycles, the oil is subject to heating, notably by pressure drops and friction and becomes fouled, thereby being detrimental to the performance of the vehicle 2 and altering the period of use of the vehicle 2.

For this, the exchange block 50 comprises a main sampling circuit 51, said circuit 51 sampling the fluid between the junction 31 of the return circuits 13, 23 and the admission 10a of the first pump 10 (in the case of diagrams B and C, this may be the admission 20a of the second pump 20, since the oil is mixed previously). The circuit 51 is connected to draining circuit 54 via a selector 53 having a passage position and a blocking position. The draining circuit 54 comprises a pressure limiter 55 and opens into the tank Res where the oil is restored subsequently. The advantages of such a placement will be explained subsequently, during the description of the different situations.

Additionally, the exchange block 50 also comprises a secondary sampling circuit 52 sampling the fluid between the admission 11a of the first apparatus 11 and the discharge 10b of the first pump 10.

The selector 53 is then preferably a three-port three-position valve able to close both sampling circuits 51, 52 and/or to connect one of the two circuits 51, 52 to the draining circuit 54 by closing the other circuit 52, 51.

The selector 53 selects from the main circuit 51 and the secondary circuit 52, the one which has the lowest pressure and connects it to the draining circuit 54.

Sampling of oil for the exchange block is therefore only ensured on the first supply 12 and return 13 circuits.

By the architectures of the hydrostatic transmission described earlier and by the localization of the fluid pick up, which allows both renewal of the oil of the first and second circuits, it is possible to only use one exchange block 50 versus two in the prior art (one for each circuit), whence a gain in room, mass, and savings.

A preferential displacement direction is defined for the vehicle 2, thereby allowing definition of the front wheels 2a and of the rear wheels 2a.

According to a first definition, the front wheels 2a give the possibility of "towing" the vehicle 2 and the rear wheels of "propelling" the vehicle 2b. This definition depends on the position of the centre of gravity of the vehicle 2: by orthogonally projecting the wheel/ground contact point and the centre of gravity on a plane, the wheels will be said to be:

traction wheels if their projection is located between the front (along the preferential direction) and the projected centre of gravity, and propelling wheels if they are located on the side of the rear and the projected centre of gravity.

According to a second definition, for a vehicle 2 in forward and upward motion, the front wheels 2a are those which are found at a higher altitude than the rear wheels 2b.

In the case when the vehicle 2 comprises intermediate wheels, depending on their role, they may be considered as rear wheels relatively to the front wheels 2a or front wheels relatively to the rear wheels 2b.

In the configuration as illustrated in the figures, the vehicle 2 typically comprises four wheels including two front wheels 2a and two rear wheels 2b, regardless of the definition used in the present case. Nevertheless, the device 1 may be adapted to other configurations (six, eight wheels . . . ), depending on the (traction or propulsion) role or on the altitude of the wheel according to the definitions given earlier.

The first apparatuses 11 powering the front wheels 2a are then each connected to the first supply 12 and return 13 circuits, in parallel. The second apparatuses 21 powering the rear wheels 2b are then each connected to the second supply 22 and return 23 circuits, in parallel.

The first apparatus 11 powers the front wheel 2a and the second apparatus 12 powers the rear wheel 2b. Thus, the non-return valve 30 allows passage in the direction from the supply circuit 12 of the front wheels 2a to the supply circuit 22 of the rear wheels 2b.

The cylinder capacity of the second apparatus 21 is greater than or equal to that of the first apparatus 11, for called flow reasons which will be explained subsequently.

Now, the invention will be described upon placing the device and the vehicle in a situation, the selected hydraulic circuit being diagram A.

FIG. 4 illustrates the device 1 when the vehicle 2 is in forward motion (direction of the arrow) and without slipping or skidding of the wheels. The cylinder capacity ratio between the first apparatus 11 (that of the front wheels 2a) and the second apparatus 21 (that of the rear wheels 2b) is here 2/3 (two liter cylinder capacity for the first apparatus 11 and three liters for the second apparatus 21). The values appearing in FIG. 4 are examples and allow easy calculation of the cylinder capacity ratios. In the same way, the flow rates of the different circuits are illustrated in the diagram. These values are also examples and allow easy calculation of the flow rate ratios.

Each pump delivers a certain flow rate (here 100 L/min). The cylinder capacities of the apparatuses 11, 21 not being the same, the required oil flow rates are not the same (the flow calls are accomplished in the cylinder capacity ratio). Thus, a portion of the flow rate (here 80 L/min) of the first pump 10 feeds the first apparatus 11 and another portion of the flow rate (here 20 L/min) is not used by the first apparatus 11 and is therefore used for feeding the second apparatus 21 for which the flow rate (here 100 L/min) of the second pump 20 is not sufficient for obtaining the same speed of rotation. Indeed, a slight overpressure is generated in the first supply circuit 12, which allows the non-return valve 30 to be opened. In this way, the device 1 spontaneously distributes the flow of both pumps 10, 20 depending on the needs of the apparatuses without it being necessary to electronically or mechanically control valves.

From now on, it is understood why the cylinder capacity of the first apparatus 11 is less than or equal to that of the second apparatus 21: indeed, the non-return valve 30 only allows a transfer of oil from the first circuit 11 to the second supply circuit 12. If the cylinder capacity of the first apparatus 11 was strictly greater than that of the second apparatus 12, a portion of the flow rate of the second pump 20 should be provided to the first apparatus 11, which the non-return valve 30 does not allow. Additionally, it is preferable that the whole flow rate received by the second apparatus 21 should not be only provided by the second pump 20; this is why, for a determined speed of rotation, in order to allow mixing of the oils, the flow rate of the second pump 20 is preferably less than the flow call from the second apparatus 21. If the flow call cannot be satisfied by the first pump 10, the speed of the vehicle 2 then decreases.

At the return circuits 13, 23, both flow rates of the first circuit (here 80 L/min) and of the second circuit (here 120 L/min) are again divided between both pumps, by the permanent fluidic communication between both return circuits 13, 23. In this way, each pump 10, 20 receives the same flow rate which it has transmitted (here 100 L/min).

The pressure in the admission circuits 12, 22 is greater than that in the return circuits 13, 23 (of the order of 400 bars versus 20 bars).

According to an embodiment, given the values of the pressures in the circuits, the selector 53 selects the main sampling circuit 51 of the exchange block 50 for sampling a certain flow (here 10 L/min) between the junction 31 of both return circuits 13, 23 and the admission orifice 10b of the pump 10. Given that the flow rate in the first return circuit (here 80 L/min) is smaller than the flow rate before said junction 31 than after (here 100 L/min), it is ensured that the sampled fluid flow rate (here 10 L/min) comprises oil from each apparatus 11, 21, which contributes to renewing the oil of the whole of the circuit and not only of a single apparatus. Said sampled oil flow is compensated at the first return circuit 13 by the booster pump 40, so that the first pump 10 actually receives the same flow which it transmits (here 100 L/min).

Alternatively, each respective pump 10, 20 may provide the exact flow rate required for the respective apparatus 11, 21. Thus there is no oil transmitted by the non-return valve 30. Nevertheless, such an embodiment does not promote the mixing of the oil at the main sampling circuit 51 since each return circuit 13, 23 transmits an equivalent flow to that transmitted by the respective pumps 10, 20.

FIG. 5 illustrates the device 1 when the vehicle 2 is in backward motion (direction of the arrow) and without any slipping. The ratio of the cylinder capacity is here again 2/3.

Due to a larger cylinder capacity in the second apparatus 21 than in the first apparatus 11, only the second pump 20 is actuated.

The latter delivers a flow (here 100 L/min) towards the return circuits 13, 23. By the flow calls of the apparatuses 11, 21 and the fluidic communication between both return circuits 13, 23, the flow rate of the second pump 20 is distributed between said both circuits (here 33 L/min for the first return circuit 13 and 67 L/min for the second return circuit 23).

The flow rate of the first return circuit 13 is again found in the first supply circuit 12 and subsequently joins up, via the non-return valve 30, with the second supply circuit 22, so that the second pump 20 actually recovers the transmitted flow.

Alternatively, the first pump 10 is also actuated and provides a flow rate adapted to the first apparatus 11, i.e. the whole of said flow is absorbed by said apparatus 11 (for this, the ratio of the flow rate provided by the first pump 10 over that of the second pump 20 is for example equal to said cylinder capacity ratio).

FIG. 6a illustrates the device 1 when the vehicle 2 is in backward motion (direction of the arrow) and with slipping of the rear wheels (see FIG. 6b). The ratio of the cylinder capacities is here again 2/3. In addition to the second pump 20, the first pump 10 is this time actuated and provides a flow adapted to the first apparatus 11, i.e. the whole of said flow is absorbed by said apparatus 11 (for this, the ratio of the flow rate provided by the first pump 10 over that of the second pump 20 is for example equal to said cylinder capacity ratio, modulo the flow sampled by the exchange block 50).

Such an actuation of the first pump 10 advantageously gives the possibility of acting against slipping of the rear wheels 2b during backward motion. Indeed, in such a vehicle 2, when the wheels skid, they generate a "suction" of flow, i.e. the oil tends to move towards the apparatus powering the wheels which skid, i.e. the apparatus which undergoes a pressure drop.

In the present case, if the rear wheels 2b skid, the pressure in the return circuits 13, 23 drops (typically 100 bars versus 400 bars without skidding) and the second apparatus 21 generates a flow call. As the second pump 20 cannot absorb a flow rate greater than what it delivers, the flow call which cannot be satisfied will cause an increase in the pressure in the second supply circuit 22 and in this way, the pressure difference around the second apparatus 21 is reduced. Thus, the torque provided at the rear decreases, giving the possibility of limiting or stopping the slipping of the rear wheels 2b. The first apparatus 11, always fed by the first pump 10, gives the possibility of keeping the drivability.

According to an embodiment, given that the pressure is greater in the return circuit 13 than in the supply circuit 12 (it is recalled that the apparatuses 11, 21 operate in backward motion), the secondary sampling circuit 52 samples a portion of the flow of the first supply circuit 12 (here 10 L/min) for sending it towards the exchange block 50. The booster pump 40 compensates for this sampling at the discharge 10b of the first pump (it is recalled that the vehicle is in backward motion in this scenario).

Alternatively, if both apparatuses 11, 21 have equal cylinder capacities, both pumps 10, 20 may be actuated by delivering a same flow rate. In this way, each flow call of both apparatuses 11, 21 being the same, there will not be any oil exchange at the non-return valve 30.

With diagram A, this does not contribute to the mixing of oil allowing renewal of the oil of the device with a single exchange block 50. On the other hand, with diagrams B and C, the oil mixing is accomplished.

FIG. 7 illustrates the device 1 when the vehicle is in forward motion (direction of the arrow) under transfer conditions (high speed) with a first apparatus 11 with variable cylinder capacities (of a ratio (1+1)/3 comparatively with the cylinder capacity of the second apparatus 21). Under transfer conditions, only the first cylinder capacity of the first apparatus 11 is activated, so that the cylinder capacity ratio is in fact 1/3. Both pumps 10, 20 are actuated and deliver a same flow rate (here 100 L/min). The principle of distributing the flow rate is similar to that of FIG. 3.

Because of the cylinder capacity ratio of 1/3, one portion of the flow rate of the first pump 20 (here 50 L/min) is re-directed towards the second apparatus 21 (which receives here a flow rate of 100+50 L/min) via the non-return valve 30.

The distribution is automatically accomplished again at the return circuits 13, 23. Also preferably, the flow sampling for the exchange block 50 is again found, similarly to the configuration of FIG. 5.

At the first apparatus 11, an annex circuit 111 and a selector 112 are noted. Said selector gives the possibility of changing the cylinder capacity of said apparatus (here from 1 L to 1+1=2 L) depending on the use, by feeding from the first supply circuit 12, either:
- only a sole cylinder capacity (see FIG. 7), in this case, the other cylinder capacity is fed from the first return circuit 13 via said selector 112 and the annex circuit 111, so as to allow rotation of said apparatus;
- both cylinder capacities, in this case, the architecture of the circuits is similar to that of an apparatus having a single cylinder capacity.

The sampling of oil for the exchange block 50 is ensured by the main sampling circuit 51 and the flow rate of sampled oil is compensated by the booster pump 40 at the first return circuit 13 (similarly to the embodiment of FIG. 3).

In this situation, the pressure in the admission circuits 12, 22 is greater than that in the return circuits 13, 23 (of the order of a maximum of 400 bars versus 20 bars).

FIG. 8a illustrates the device 1 when the vehicle 2 is in forward motion (direction of the arrow) with skidding of the front wheels 2a (see FIG. 8b). The ratio of the cylinder capacities is still 2/3, with a larger cylinder capacity at the rear (here 3 L) than at the front (here 2 L).

As mentioned earlier, when the wheels skid, the apparatus is subject to a pressure drop and generates a "suction" of flow, i.e. the oil tends to move towards the apparatus powering the wheels which are skidding.

The example appearing in FIG. 8a gives the possibility of illustrating one of the advantages of the invention.

Each pump 10, 20 here provides the same flow rate (100 L/min). In the previous case, due to the flow call of the second apparatus 21, the non-return valve 30 allows the flow to pass from the first supply circuit 12 to the second supply circuit 22. In the case of skidding of the front wheels 2a, as the first apparatus 11 undergoes a pressure drop and that the pressure in the first supply circuit 12 drops, said apparatus 11 will capture all the flow of the first pump 10 (here 100 L/min) but not that of the second pump 20, because of the presence of the non-return valve 30. In this way, the second apparatus 21 is always fed with pressurized oil (here 100 L/min) and the rear wheels 2b retain their drivability.

It will be noted that the speed of rotation of said apparatus 21 is reduced because of the lowering of flow rate (here 20 L/min, a difference relatively to absence of skidding), said lowering being due to the first apparatus 11 which captures all the flow of the first pump 10.

In the case of skidding, the non-return valve 30 gives the possibility of separating the supply circuits 12, 22 in order to ensure drivability of the rear wheels 2b.

Alternatively, as soon as slipping is detected, the flow rate of the second pump 20 is adjusted so as to provide the whole of the flow called by the second apparatus 21 (here 120 L/min) and the flow rate of the first pump 10 is adjusted to the flow rate of the first apparatus 11 (here 80 L/min). In this way, the vehicle 2 does not undergo any slowing down.

During this operation, and with diagram A, there is hardly any mixing of oil at the return circuits 13, 23, because of the equivalent flow rate in each of the circuits 13, 23. Nevertheless, as skidding is only a transient condition, this is not a disadvantage which requires to be solved. With the other diagrams B and C, mixing is ensured.

The sampling of oil for the exchange block 50 is accomplished by the main sampling circuit 51 and the sampled oil flow rate is compensated by the booster pump 40 at the first return circuit 13 (similarly to the embodiment of FIGS. 3, 6).

FIG. 9a illustrates the device 1 when the vehicle 2 is in forward motion (direction of the arrow) retained in a downward movement (see FIG. 9b) without any skidding. The ratio of the cylinder capacities is still 2/3, with a larger cylinder capacity at the rear (here 3 L) than at the front (here 2 L).

In this configuration, the apparatuses 11, 21 operate as a pump and the pumps 10, 20 operate as a motor.

Indeed, the pumps 10, 20 deliver a certain flow rate (here 100 L/min for both of them) which is again distributed in a similar way among the first supply circuit 12 (here 80 L/min) and the second supply circuit 22 (here 120 L/min), via the non-return valve 30. On the other hand, the pressure in the return circuits 13, 23 is greater (high pressure) than that (low pressure) of the supply circuits 12, 22 (of the order of 400 bars versus 20 bars) since the vehicle 2 is retained in the downward movement. More specifically, the pressure in the return circuits 13, 23 is determined by the load of the vehicle 2 (which depends on its mass, on the slope, etc.).

The oil received at the admission orifices 11a, 21a is therefore "pumped" by the apparatuses 11, 21 which increase oil pressure. In this way, the apparatuses 11, 21 have a negative (or resistant torque) which allows braking of the vehicle 2 (the wheels always rotate in the direction of the forward motion). The pumps 10, 20 receive oil under high pressure, which makes the pumps 10, 20 operate as a motor, which pass on the torque to the supply of the pumps, therefore typically on the heat engine, which then uses the motor brake for braking the vehicle. The torque transmission chain is therefore effected from the front 2a and rear 2b wheels to the apparatuses 11, 21, and then to the pumps 10, 20 and to the motor brake of the heat engine.

Alternatively, the high pressurization produced by the apparatuses 11, 21 may be used for loading oil tanks under high pressure in order to have reserves for providing occasional power (hybridization and energy recovery domain), notably on other functions of the vehicle (tools, etc.).

In this configuration, the oil intended for the exchange block 50 is sampled at the first supply circuit 12 by the secondary sampling circuit 52, where the pressure is the lowest (low pressure) and the booster pump 40 also again provides supply at the first supply circuit 12.

FIG. 10a illustrates the device 1 when the vehicle 2 is in forward motion (direction of the arrow) retained in a downward movement (see FIG. 10b) and when the rear wheels 2b are blocked. The ratio of the cylinder capacities is still 2/3, with a greater cylinder capacity at the rear (here 3 L) than in the front (here 2 L).

In this configuration, the apparatuses 11, 21 always operate as a pump and the pumps 10, 20 operate as a motor.

In the state of the art, if the negative (or resistant) torque at the second apparatus 21 causes blocking of the rear wheels 2b, the retention is suddenly reduced, which may cause loss of control of the vehicle 2.

By means of the invention, one is protected against this consequence. Indeed, when the rear wheel 2b slows down or is blocked, the pressure in the second supply circuit 22 will increase, the non-return valve 30 preventing the oil from being redirected towards the first supply circuit 12. As the pressure increases in the second supply circuit 22 and the pressure in the second return circuit 23 is always determined by the load, the pressure difference around the second apparatus 21 decreases, which causes reduction in the negative (or resistant) torque and the wheels 2b are unblocked and will again begin to rotate.

As a counterpart, as the pressure in the second supply circuit 22 has increased, there is no longer any oil flow transfer from the first supply circuit 12 to the second 22, which increases the flow rate feeding the first apparatus 11 (here a flow rate of 100 L/min). In this way, the speed of the vehicle will increase but still keeping the drivability of the four wheels. The non-return valve 30 in this configuration allows separation of both supply circuits 12, 22.

In this configuration, the oil intended for the exchange block 50 is sampled at the first supply circuit 12 by the secondary sampling circuit 52, where the pressure is the lowest (low pressure) and the booster pump 40 also provides supply at the first supply circuit 12 (similarly to the embodiments of FIG. 8a).

The use of the non-return valve 30 thus allows limitation of the skidding of the wheels located at the highest altitude.

Further, the junction 31 of the return circuits 13, 23 allows mixing of the oil and thus only having a single exchange block 50 for sampling and recycling the oil.

FIG. 11a illustrates the device 1 when the vehicle 2 is in forward motion (direction of the arrow) and in a bend, the front wheels 2a being driving wheels. The front wheels 2a cover a greater distance than the rear wheels 2b (see FIG. 11b). The flow call of the first apparatus 11 is greater than in the case of a straight line.

Two possibilities are conceivable:
  the flow rate of the first pump 10 is increased in order to be able to satisfy both the flow called by the first and the second apparatuses 11, 21. The flow rate of the second pump 20 is unchanged.
  the flow rates of both pumps 10, 20 are increased in order to be able to satisfy both flow calls of the apparatuses 11, 21.

In the case of skidding during a bend, the skidding control will be ensured in the same way, with the rear axle which may operate at a high pressure even in the case of loss of adherence of the front axle. This is a particular case, but it quite rapidly appears in situations of a bend on a vehicle with driven front wheels 2a for example. In this case, the front apparatuses 11 mounted on the driven wheels 2a, call for flow which may be greater than the flow required for the rear wheels 2b.

Considering the features of the invention, it is possible to install a more economical first pump 10 than the second pump 20, i.e. having lower power. Indeed, during skidding at the front, the non-return valve 30 prevents communication of oil, which means that only the second pump 20 provides drivability to the vehicle 2 via the rear wheels 2b. In practice, it is actually possible to use a second pump 20 having a maximum greater tare on the second supply circuit 22 than on the first front supply circuit 21 as regards pressure during forward motion.

For example, the second pump 20 is of the "heavy duty" type (more than 100 cm$^3$), which may provide a pressure of 500 bars and the first pump 10 is of the "medium duty" type (about 70 cm$^3$) which may provide a pressure of 350 bars (such cylinder capacities give the possibility of ensuring the flow rates generated in the apparatuses 11, 21 with respective cylinder capacities of two and three liters). This allows savings of room, of mass and notably of costs.

Alternatively or additionally, the pumps 10, 20 may be with a proportional electric control, giving the possibility of providing the minimum strict flow rate to each apparatus 11, 21, as this has been explained in certain situations previously. For example, exactly providing the flow call inter alia allows limitation of the skidding and also of the excessive speed during skidding of the front wheels 2a during upward motion (see FIGS. 6a, 6b) since the flow rate is limited to the required flow rate (due to the cylinder capacity difference, it is recalled that a same flow rate causes different speeds of rotation) or for example during a downward motion with retention (see FIGS. 7a, 7b). The second pump 20 thus preferably has a maximum flow rate equal to or less than the maximum admissible flow rate in the second apparatus 21.

The detection of skidding or slipping of the wheels may be accomplished by means of a skidding sensor 60.

The measurement of the bend may be conducted at one sensor of a bend sensor 61.

The adjustment of the pumps with a proportional electric control may be carried out by a calculation unit 62, receiving data from the sensors 60, 61.

The invention claimed is:

1. A hydraulic transmission device for a vehicle, said device comprising:
   a first pump and a second pump, each pump comprising an admission and a discharge,
   a first hydraulic apparatus and a second hydraulic apparatus, each apparatus comprising an admission and a discharge,
   a first supply circuit connecting the discharge (10b) of the first pump to the admission of the first apparatus and,
   a second supply circuit connecting the discharge of the second pump to the admission of the second apparatus and
   wherein the device further comprises:
   a non-return valve between the supply circuits, the valve having a direction for passing from the first to the second supply circuit, a fluidic communication through the non-return valve being effective when a pressure within the first supply circuit exceeds a pressure within the second supply circuit,
   a first return circuit connecting the discharge of the first apparatus to the admissions of said pumps,
   a second return circuit connecting the discharge of the second apparatus to the admissions of said pumps,
   so that the return circuits are in permanent fluidic communication with each other through a junction.

2. The device according to claim 1, wherein the first return circuit is connected to the admission of the first pump and the second return circuit is connected to the admission of the second pump, both return circuits being connected together through a communication circuit.

3. The device according to claim 1, wherein the first return circuit is connected to the admission of the second pump and the second return circuit is connected to the admission of the first pump, both return circuits being connected together through a communication circuit.

4. The device according to claim 3, wherein the second apparatus has a larger cylinder capacity than the first apparatus.

5. The device according to claim 1, further comprising an exchange block able to sample oil for its treatment, said exchange block comprising a main sampling circuit sampling the fluid between:
   the junction of the return circuits and
   the admission of the first pump,
   so that the exchange block may sample oil from both the first and the second apparatus.

6. The device according to claim 5, wherein the exchange block further comprises a secondary sampling circuit sampling fluid between:
   the admission of the first apparatus and
   the discharge of the first pump,
   both sampling circuits being connected at a selector able to close both circuits or to connect one of the two circuits to a draining circuit while closing the other.

7. The device according to claim 1, wherein the pumps are pumps with proportional electric control, the second pump having a maximum flow rate of less than or equal to the maximum admissible flow rate in the second apparatus.

8. The device according to claim 1, wherein for a determined speed of rotation of the apparatuses, a flow rate of the second pump is less than a flow call of the second apparatus, and a flow rate of the first pump is greater than a flow call of the first apparatus, so that the first pump is able to complete the flow call of the second apparatus via the non-return valve.

9. A vehicle comprising a device according to claim 1, having a preferential displacement direction defining front and rear wheels, wherein the first hydraulic apparatus powers at least one front wheel and the second hydraulic apparatus powers a rear wheel.

10. A method for using a vehicle according to claim 9, wherein the second apparatus of said vehicle has a cylinder capacity greater than the first apparatus, said method comprising a step during which:
    the non-return valve sends a flow of oil from the first pump to the second apparatus.

11. The method according to claim 10, comprising a sequence of steps in which the non-return valve passes from a passage condition to a blocking condition when:
    the front wheels begin to skid upon forward motion,
    the rear wheels are blocked upon retention during forward motion.

12. The method according to one of claim 10 or 11, comprising a sequence of steps in which the non-return valve passes from a blocking condition to a passage condition when:
    the front wheels stop skidding upon forward motion,
    the rear wheels are unblocked upon retention during forward motion.

13. The method according to claim 10, wherein the vehicle is in backward motion, comprising the steps:
    detecting slipping of a rear wheel,
    adjusting the flow rate of the first pump so as to provide at most the flow called by the first apparatus.

14. The method according to claim 10, wherein the vehicle is in forward motion, comprising the steps:

detecting slipping of a front wheel,
adjusting the flow rate of the second pump so as to provide the whole of the flow called by the second apparatus.

15. The method according to claim 10, wherein the front wheels of the vehicle are steered wheels, comprising the steps:
detecting a bend covered by the vehicle,
adjusting the flow rate of the first and second pumps so as to provide the whole of the flows respectively called by the first apparatus and the second apparatus.

* * * * *